United States Patent [19]

Rice et al.

[11] 4,017,571

[45] Apr. 12, 1977

[54] METHOD OF PRODUCING THREE DIMENSIONAL SKELETAL STRUCTURES

[75] Inventors: Warren A. Rice, Dexter; Clarence S. Vinton, Ann Arbor; Hugh Richard Norris, Fowlerville, all of Mich.

[73] Assignee: Chemotronics International, Inc., Ann Arbor, Mich.

[22] Filed: Apr. 2, 1973

[21] Appl. No.: 346,999

Related U.S. Application Data

[63] Continuation of Ser. No. 131,224, April 5, 1971, abandoned.

[52] U.S. Cl. .................................. 264/42; 164/120; 264/49
[51] Int. Cl.² .................... B29D 27/00; B22F 3/02; B22F 3/10
[58] Field of Search .............. 264/49, 44, 122, 111, 264/317, 42; 75/222

[56] References Cited

UNITED STATES PATENTS

| | | | |
|---|---|---|---|
| 2,695,231 | 11/1954 | Causley | 75/222 |
| 3,078,552 | 2/1963 | Grandey | 264/44 |
| 3,258,349 | 6/1966 | Scott | 264/44 |
| 3,336,134 | 8/1967 | Kulp et al. | 75/222 |
| 3,396,923 | 8/1968 | Windecker | 264/45 |
| 3,535,110 | 10/1970 | Todd | 75/222 |
| 3,734,723 | 5/1973 | Blasch | 75/222 |

OTHER PUBLICATIONS

"Powder Metallurgy", Peter Schwarzkopf, Int. Journal of Powder Metallurgy, 2/4/1966, pp. 3-11.

Primary Examiner—Robert F. White
Assistant Examiner—James B. Lowe
Attorney, Agent, or Firm—Ian C. McLeod

[57] ABSTRACT

The preparation of three dimensional skeletal structures using the step of deforming rounded beads to form a mold or matrix is described. A filler material is introduced and then rigidified to form the skeletal structure. The deformable beads are composed of materials which deform upon compression or expansion due to pressure from adjacent beads and included, for instance, metals, waxes, salts, polymers, and ceramic compositions in their plasticly deformable states. The filler material which rigidifies to form the skeletal structure can be composed of solidifiable materials such as metals, polymers, or ceramic compositions. The solid material volume of the skeletal structure so formed upon removal of the beads is between about two percent (2%) to twenty percent (20%) of a corresponding volume of a non-skeletal solid material. The corresponding porosities representing the interconnected void volumes are between about eighty percent (80%) and ninety-eight percent (98%) of a corresponding volume of a non-skeletal solid material. The skeletal structures so formed can be flexible, semiflexible or rigid and are useful as heat exchangers, catalyst supports, distillation tower packings, filters and the like.

12 Claims, 6 Drawing Figures

METHOD OF PRODUCING THREE DIMENSIONAL SKELETAL STRUCTURES

This application is a continuation of Ser. No. 131,224, filed Apr. 5, 1971, now abandoned.

BACKGROUND OF THE INVENTION

The present invention relates to a method of producing three dimensional skeletal structures of continuous interconnected strands, the structures having a large void volume and wherein the void volume is substantially interconnected throughout the skeletal structure. More particularly, the present invention relates to the preparation of this skeletal structure using deforming and usually subsequently removable beads which form a mold.

The preparation of similar forms of skeletal structures from polymeric materials is known to the prior art. Thus the preparation of foamed or cellular isocyanate derived polymers is well known. In general, the foamed polyurethanes have a three dimensional skeletal structure of interconnected strands and in addition have membranes joined to the strands which divide contiguous cells.

To foam the isocyanate derived polymers, a gas bubble is generated in situ in the liquid polymer material which expands such that contiguous cells are formed. The strands forming the cells generally outline the edges of a polyhedron with the membranes forming the faces of the polyhedron. The membranes can be continuous between the strands or cracked or broken to form an interconnection between adjacent cells, but in either case the membranes restrict fluid flow between adjacent cells.

In recent years there has been considerable effort expended in developing commercially acceptable processes for the removal of the membranes from foamed polymeric materials, particularly isocyanate derived polymers. Thus thermal processes wherein the membranes are selectively destroyed have been developed such as described in U.S. Pat. Nos. 3,175,025; 3,175,030 and 3,329,759 and chemical processes such as described in U.S. Pat. No. 3,171,820 wherein the membranes are hydrolytically destroyed.

Processes have been described for foaming materials besides isocyanate derived polymers such as vinyl and rubber materials but difficulties have been encountered in providing an interconnected void space as well as a relatively uniform cell size. The foaming of metals has been described in U.S. Pat. Nos. 2,937,938 and 2,974,034. Where such foaming operations can be used, membranes dividing contiguous cells are produced.

The preparation of porous structures using various molding techniques is well known to the prior art. Thus British Pat. No. 853,030; U.S. Pat. Nos. 2,721,378; 2,805,208; 2,838,829; 3,202,733 and an article by P. Schwartzkopf from the International Journal of Power Metallurgy 2(4) (1966) pages 3 to 11. In each instance the structures formed have relatively very low porosities in the range of about 30 percent and to a maximum of about 70 percent. These porous structures are practically closed cell. In general, the upper limit of porosity and the interconnection of the voids has been dictated by the mold structure used.

It is therefore an object of the present invention to provide a method for the preparation of three dimensional skeletal structures which does not involve foaming or the production of membranes. It is further an object of the present invention to provide a method for the preparation of such skeletal structures which is simple and economical. These and other objects will become increasingly apparent by reference to the following description and the drawing.

IN THE DRAWING

FIG. 1 schematically illustrates the steps in the method of the present invention.

FIG. 2 schematically illustrates a die with piston means for compressing deformable beads.

Figure 6:
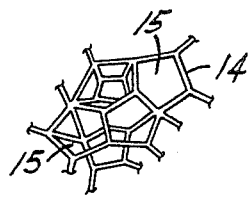

FIG. 6 also schematically illustrates the three dimensional skeletal structure produced from a filler material rigidified in the spaces between the deformed beads and after the removal of the deformed beads.

The present invention relates to the improvement in the method of producing a three dimensional skeletal structure by introducing and rigidifying a filler material in a matrix forming a mold which comprises: deforming packed rounded beads which are in contact with each other to form a matrix such that there are void spaces forming a three dimensional skeletal structure of continuous interconnected strands which are filled by the filler material and rigidified to form the skeletal structure. The filler material can be introduced before or after the beads are deformed.

The rounded deformable beads when deformed in contact with each other greatly reduce the porosity or void volume originally between the beads. As a result the skeletal structure which is the reverse of the deformed beads has a very high porosity between about 80 percent and 98 percent and there are no membranes or partitions dividing contiguous cells since the filler material is not introduced into the areas of contact between the deformed beads.

In order to achieve these porosities and the skeletal structure, the beads are rounded, preferably with a spherical shape. The sizes and shapes of the beads are preferably substantially uniform in relation to each other and are rounded in all dimensions. When the beads are deformed they form a matrix or mold for the three dimensional skeletal structure. The strands of the skeletal structure formed from the rounded beads outline the edges of the deformed beads in all dimensions in a substantially regular pattern throughout the skeletal structure.

Figure 5:
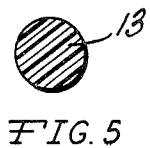

Referring to FIGS. 1, 2, 3 and 4, a die 10, which can have any cross-sectional geometry, is preferably fitted with a piston or pistons 11 or 12, which either fits loosely on the sides of the chamber 10 or has openings (not shown) to allow air to escape when the pistons 11 and 12 are brought together. Deformable beads 13 (shown as round in cross-section in FIG. 5) are provided within the die 10 and then deformed by the pistons 11 and 12. The beads can alternatively be expanded in the die 10 to deform them if they are so constructed and in this instance, the pistons 11 and 12 act as closures. Preferably a force F is then applied to the outside faces of the pistons 11 and 12 to deform the beads 13 with deformations at multiple points due to contact with adjacent beads 13. After a filler material is introduced and rigidified and the deformed beads 13 are removed, the skeletal structure is formed where the strands outline a polyhedral structure 14, the faces 15 of which are multi-sided as shown in FIG. 6.

The deformable beads 13 can be composed of essentially any material which will be deformed at multiple contact points by contacting adjacent deformable beads 13 and can be solid or hollow or gas filled and, depending upon their composition, expandable. Such compositions are, for instance, glasses (at plastic temperatures), clays, plaster, waxes, metals, elastomers, resins, polymers and the like. The formation of beads 13 from these materials both solid and hollow is well known to the prior art and in many instances spherical beads 13 including expandable beads 13 are commercially available in a wide range of diameters.

It is preferred that the beads 13 have an average diameter ranging from about 1/100 inch, and larger, the lower limit being that which readily leaves a void volume which can be filled. Further, the beads 13 preferably have comparable dimensions from bead to bead, usually within plus or minus 20 percent of the average diameter of the beads 13 selected.

The beads 13 are deformed by compression or expansion to reduce the void volume between adjacent beads 13 until the deformed void volume is substantially less than 26% which is the approximate void volume or porosity theoretically available from the closest packing of spherical beads 13. Usually this void volume between the deformed beads 13 is between about 2% and 20%. The beads 13 can be arranged in closest packing in the die 10 such that void volume is about 26% of the total volume of the space defined by the die 10 and pistons 11 and 12; however, other packing arrangements can be used and usually it is not worthwhile to develop closest packing as this can be time consuming. If necessary, the beads can be preconditioned to make them plastic and thus deformable such as by heating and the like.

The hardenable filler material is rigidified between the deformed beads 13. With powders as the filler material they can be introduced before or after deformation of the beads 13. Liquid filler materials are usually introduced after deformation of the beads 13.

The deformed beads 13 can be bonded together, particularly by heating with thermoplastic materials which fuse or weld the deformed beads 13 together. It is not unusual for the beads 13 to self bond when deformed. The die 10 is used to maintain the undeformed or deformed beads 13 in position while this is accomplished. Alternatively, the beads 13 can be bonded by providing a thin film of liquid bonding agent around them such that they are bonded together. Once the deformed beads 13 are bonded together, they can be removed from the die 10 and used as the mold or matrix. Alternatively, the deformed beads 13 can be retained in the die 10, without bonding, for the introduction and hardening of the filler material.

The hardenable filler material can be gaseous, liquid or solid for introduction into the mold defined by the deformable or deformed beads 13, the selection depending upon the composition of the beads 13 and any bonding agent used. Where powdered materials are introduced into the mold, the preferred method is to deform the beads 13 only about one-half or less of their ultimate degree of deformation and to contain them in this state; introduce the powdered material; vibrate to effect good penetration and packing of the powder in the void spaces between the partially deformed beads 13 and then continue with the deformation step to compact the powder and to achieve the full extent of the desired bead deformation. This procedure increases the void volume of the resulting skeletal structure and aids in bead removal subsequent to the hardening of the filler material.

Where the deformable beads 13 are composed of relative lower melting material than the melting point of the hardened filler material, the deformed beads 13 are usually removed by melting, decomposition, or volatilization to leave the skeletal structure 14 with interconnected voids or cells 15. If the filler material is a compacted powder, it should have sufficient "green" strength to allow the removal and sintering. Where the deformed beads 13 are composed of a relatively higher melting material than the melting point of the hardened filler material, the deformed beads 13 can then be removed preferably with a solvent or reactant which is non-solvent for or non-reactant with the filler material.

Having generally described the method of the present invention the following is a specific description.

EXAMPLE I

Figure 1:
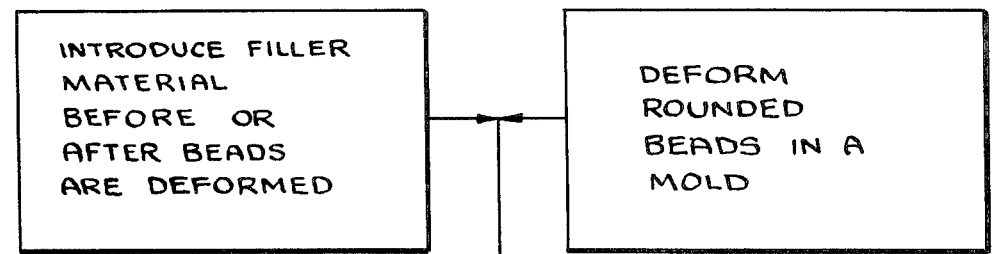
Figure 2:
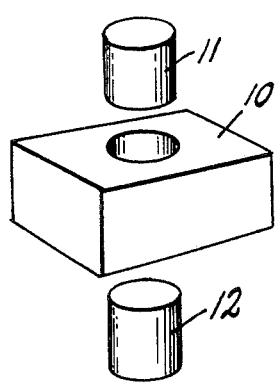
Figure 4:
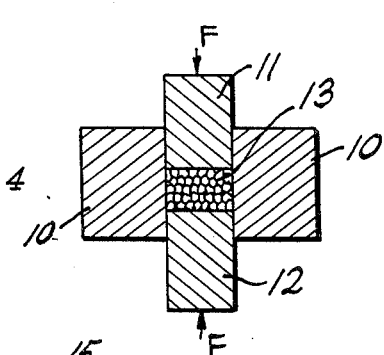
FIG. 4 illustrates the compaction of the beads in the die by the pistons shown in FIG. 3 such that they are deformed with void spaces forming the edges of a polyhedral structure as shown in FIG. 6.
Figure 3:
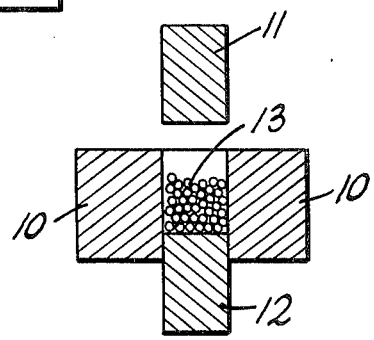
FIG. 3 illustrates the cross-section of the die and pistons shown in FIG. 2 with the pistons ready to compress deformable beads which are preferably spherical as shown in cross-section in FIG. 5.

A mixture of finely divided iron powder and copper powder (primarily a cementing material for the iron powder) of 100 mesh and 200 mesh or less, respectively, was prepared in the ratio of nine (9) parts by weight to (1) part by weight. To this mixture was added 0.25 percent by weight of stearic acid as a lubricant for the powder. A cylindrical mold as shown in FIGS. 2, 3, and 4 having an inside diameter of 1.212 inches and an effective length of about 2.0 inches was filled with (3/16 inch) diameter spherical beads made of an alloy of 48 percent bismith, 28.5 percent lead, 14.5 percent tin, and 9.0 percent antimony which melts at about 190° F. The beads were compressed to reduce the volume between the beads by decreasing the cylinder length about (20%). The metal powder mixture was vibrated into the voids between the deformed beads. The powder and bead mixture was then compacted at a pressure of about (40) tons per square inch which reduced the volume by decreasing the cylinder length by an additional (10%). The total volume reduction of the beads was (30%) from the original volume. The alloy beads were removed from the compacted powder in hot water (200°–212° F). The green product had a compression strength sufficient to allow sintering. The green product was sintered in a controlled atmosphere comprising thermally cracked propane to prevent oxidation of the sample for one-half hour at 1940° F which produced a sintered product having a compression strength of about 770 pounds per square inch and a density or solid content of about (14%) of a corresponding solid metal volume. The corresponding void volume or porosity was about (86%).

EXAMPLE II

The preceeding Example I was repeated except that (100) parts copper powder of 150 mesh and smaller was mixed with (¼) part stearic acid. The compacted green product had a good compression strength of about 370 pounds per square inch. The product had a density of about fourteen and (14.4%) of a corresponding solid metal volume. The corresponding porosity was about (85.6%).

EXAMPLE III

The procedure Example I was repeated using polyvinyl chloride powder with a small amount of methylene chloride to aid fusion. The metal balls were removed with dry hot air to prevent the destruction of the shape of the polyvinyl chloride. The product was heated in an oven at about 300° F for about (4) hours to fuse the powder into the skeletal structure. The product had a density and a porosity comparable to that of Example I.

EXAMPLE IV

The procedure of Example I was repeated using 200 mesh iron powder with (0.5%) by weight graphite added as a lubricant. The powder mixture was compressed with the deformed beads using (50) tons per square inch pressure which compressed the mixture of powder and beads an additional (12%) of the original volume. The metal beads were removed with hot water and then the green compact was sintered for one-half hour at 1980° F. The sintered product had a compression strength of about 825 pounds per square inch. The density was about (14%) and the porosity was about (86%) of a corresponding solid metal volume.

EXAMPLE V

The procedure of Example I was repeated using rounded beads which are oblate elipsoids (3/16 inch) in diameter and (3/32 inch) thick. The product sintered at 1980° F had a compression strength of about 1000 pounds per square inch. The product had a density of about (14.7%) and a porosity of about (85.3%) of a corresponding solid metal volume.

EXAMPLE VI

Spherical expandable polystyrene beads which had been preexpanded to a bulk density of about two pounds per cubic foot were further expanded and deformed by heating at 115° C for about 15 minutes in a confined container which was vented at the top to reduce the void volume between the beads. The liquid alloy of Example I which was heated to 203° F was introduced into the void spaces between the deformed beads and then cooled. The deformed polystyrene beads were dissolved out with benzene. The product had a density of about (20%) and a porosity of about (80%) of a corresponding solid metal volume.

EXAMPLE VII

The procedure of Example VI was repeated except that the void volume was reduced to about (2½%) of the total volume by heating for 15 minutes with steam. The expanded and deformed beads were cooled to room temperature and the void was filled with an epoxy resin (Ciba Araldite 6005) based upon bisphenol A and having an epoxide equivalent of 190 and a viscosity of 8000 cps at 25° C as shown in Epoxy Resins (McGraw Hill Book Company, Inc.) 1957 at pages 18 to 21 cured with triethylene tetramine by placing the confined deformed beads under the resin and then evacuating the beads to force the resin between the deformed beads by external air pressure on the resin. The epoxy resin was cured at room temperature and the deformed polystyrene beads were removed with toluene. The product had a density of about (2½%) and a porosity of about (97½%) of a corresponding solid resin volume.

EXAMPLE VIII

The procedure of Example VI was repeated except that the void space was vibrated full of a metal powder consisting of (9) parts iron and (1) part copper by weight of about 150 mesh or less that had been oxidized in air at 1000° F for (10) minutes. About a (30%) phosphoric acid was introduced into the metal powder to bond it together by forming a phosphate bond between the oxidized metal particles. The deformed polystyrene beads were dissolved with toluene. The product was sintered as in Example I in a reducing atmosphere. The product had a density of about (8%) and a porosity of about (92%) of a corresponding solid volume.

EXAMPLE IX

Using the equipment of FIG. 3, the low temperature alloy spherical beads of Example I, (1/10 inch) in diameter were compressed about (20%) by volume. A liquid polyester resin was cast into the mold formed by the compressed spheres and cured. The deformed beads were removed using boiling water after the resin had cured. The product was washed with a (30%) by weight nitric acid solution. The product had a density of about (15%) and a porosity of about (85%) of a corresponding solid resin volume.

EXAMPLE X

The chamber of FIG. 3 was filled with expandable polystyrene beads (3/32 inch) in diameter. The voids were filled with a very fine polyethylene powder of about 200 mesh and the mixture was charged with an explosive gas mixture of (60%) hydrogen and (40%) oxygen at 1500 psig in the matter of U.S. Pat. No. 3,175,025 used for bonding. The explosive gas mixture was ignited which fused the polyethylene particles and expanded the polystyrene beads. The product was removed from the chamber and the deformed polystyrene beads removed with toluene. The product had a density of about (10%) and a void volume of about (90%) of a corresponding solid resin volume.

EXAMPLE XI

The procedure of Example X was repeated with (30) mesh powdered tin and an explosive gas mixture of (75%) hydrogen and (25%) oxygen by volume. The tin particles were well bonded together and the product had a density of about (10%) and a porosity of about (90%) of a corresponding solid metal volume.

EXAMPLE XII

The process of Example XI was repeated using the alloy of Example I as deformed spherical beads (3/16 inch) in diameter with equivalent results.

EXAMPLE XIII

The alloy of Example I was placed as a liquid at 230° F in a vented top container. One-eight inch diameter unexpanded polystyrene beads were introduced into the container with the heated metal. The beads expanded to fill the container forcing the metal between the beads and which also forced excess alloy out of the vented top of the container. The product was removed from the oven after 25 minutes and allowed to cool and the deformed polystyrene beads were dissolved from the skeletal structure using toluene as a solvent. The resulting product had a density of about (10%) and a porosity of about (90%) of a corresponding solid metal volume.

EXAMPLE XIV

A mixture of (1) part cornstarch, (2) parts baking soda and (1¼) part water all by volume was cooked until it was a paste. Spherical beads were formed from this mixture having a diameter of about (¼ inch) and placed in a container. The beads were compressed to (80%) of their original volume using a piston in the container and fired to 800° F which hardened the beads and also made them porous. Molten zinc was poured into the mold formed by the beads in a reducing atmosphere of natural gas to protect the metal from oxidation. After the zinc had cooled and solidified the beads were removed from the skeletal structure with aqueous acetic acid (10%) by weight which reacted with the sodium carbonate in the beads to form water soluble sodium acetate. The density was about (20%) and porosity was about (80%) of a corresponding solid metal volume.

Essentially any method of forming the beads from the plastic mass can be used. For instance, well known shot towers can be used for metals.

The general method of Examples I to XIV was repeated using different compositions and average diameters for the deformable beads, means of deforming means, various hardenable filler material compositions and different methods for the introduction of the hardenable filler material and various means of mold removal. The three dimensional skeletal structures produced were similar in respect of low density and high porosity to those shown in Examples I to XIV.

We claim:
1. In the method of producing a three dimensional skeletal structure by introducing and rigidifying a liquid hardenable filler material which is to form the skeletal structure in a matrix formed by a mold of packed beads which can be removed from the filler material by melting, decomposition or volatization or by a solvent or reactant which is a non-solvent or non-reactant with the filler material, the improvement which comprises:
   a. deforming packed beads having comparable dimensions and an average diameter of at least about 1/100th inch which are in contact with each other and which are rounded such that a mold is formed with a matrix of interconnected spaces between the deformed beads defining a three dimensional skeletal structure of continuous interconnected strands which contains the liquid filler material completely filling the matrix of interconnected spaces between the deformed beads;
   b. rigidifying the liquid hardenable filler material to form a continuous and interconnected skeletal structure having openings between the strands and wherein the deformed beads define between about 80 and 98 percent of the total volume; and
   c. removing the deformed beads without removing the filler material forming the skeletal structure.
2. The method of claim 1 wherein the liquid hardenable filler is heated to expand and deform heat expandable beads provided in a confined container.
3. The method of claim 1 wherein the liquid hardenable filler is introduced after the beads are formed.
4. The method of claim 1 wherein the liquid hardenable filler is composed of liquid resin.
5. The method of claim 1 wherein the beads are composed of a metal melting at a lower temperature than the hardened filler material which is a resin and wherein the beads are removed by melting.
6. The method of claim 1 wherein the liquid hardenable filler material is a metal.
7. The method of claim 1 wherein the beads are essentially spherical and have a substantially uniform diameter.
8. The method of claim 1 wherein the beads are deformed by expansion of expandable beads in a confined container.
9. The method of claim 8 wherein the beads are expandable polystyrene beads.
10. The method of claim 9 wherein the polystyrene beads are removed from the hardened liquid filler by heating to destroy the beads without destroying the hardened filler.
11. The method of claim 10 wherein the beads are removed with a solvent for the polystyrene which is a non-solvent for the hardened filler.
12. The method of claim 1 wherein the beads are comprised of a resin which is removed from the hardened filler which is also a resin using a solvent for the bead resin which is a non-solvent for the hardened filler resin.

* * * * *

UNITED STATES PATENT AND TRADEMARK OFFICE
CERTIFICATE OF CORRECTION

PATENT NO. : 4,017,571

DATED : April 12, 1977

INVENTOR(S) : Warren A. Rice, Clarence S. Vinton and Hugh Richard Norris

It is certified that error appears in the above-identified patent and that said Letters Patent are hereby corrected as shown below:

Column 1, line 14 "deforming" should be --deformed--.

Column 1, line 58 "power" should be --powder--.

Column 4, line 11 "relative" should be --relatively--.

Column 4, line 61 "preceeding" should be --preceding--.

Column 5, line 1, insert --of-- after "procedure"

Column 6, line 34 "matter" should be --manner--.

Column 7, line 28 "means" should be --beads--.

Column 7, line 40 (Claim 1) "voatization" should be --volatilization--.

Column 8, line 18 (Claim 3 "formed" should be --deformed--.

Signed and Sealed this twelfth Day of July 1977

[SEAL]

Attest:

RUTH C. MASON
*Attesting Officer*

C. MARSHALL DANN
*Commissioner of Patents and Trademarks*